United States Patent [19]
Marchetti

[11] 3,979,228
[45] Sept. 7, 1976

[54] BATTERY OPERATED APPLIANCE

[75] Inventor: Michael J. Marchetti, Bridgeport, Conn.

[73] Assignee: Sperry Rand Corporation, Bridgeport, Conn.

[22] Filed: May 1, 1975

[21] Appl. No.: 573,433

[52] U.S. Cl. .................................. 429/99; 206/333
[51] Int. Cl.² .......................................... H01M 2/10
[58] Field of Search ................. 136/173; 240/10.63, 240/10.65; 325/16

[56] References Cited
UNITED STATES PATENTS

| | | | |
|---|---|---|---|
| 3,542,603 | 11/1970 | Simon | 136/173 |
| 3,728,664 | 4/1973 | Hurst | 325/16 |
| 3,742,832 | 7/1973 | Stoneham et al. | 136/173 |
| 3,798,439 | 3/1974 | Land et al. | 240/10.65 |

FOREIGN PATENTS OR APPLICATIONS 638,518  6/1950  United Kingdom ................. 136/173

*Primary Examiner*—Donald L. Walton
*Attorney, Agent, or Firm*—Charles R. Miranda

[57] ABSTRACT

A battery operated appliance having a casing provided with output means and a compartment for positioning disposable batteries utilized as a source of power for the output means wherein closure means are provided for the compartment which include a hinged cover mounted for slidable movement about a hinge connection into and out of a latched position relative to the appliance casing.

5 Claims, 7 Drawing Figures

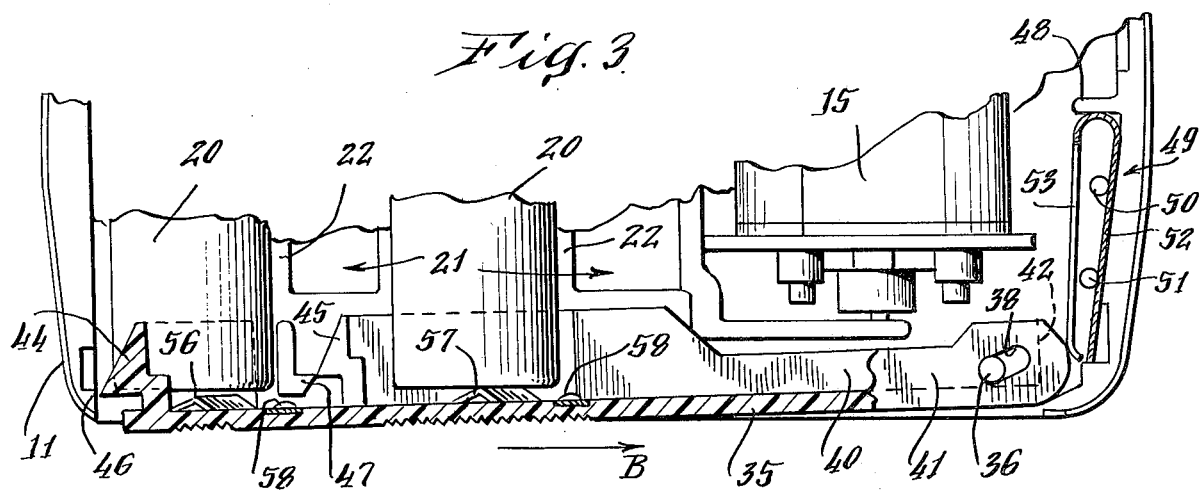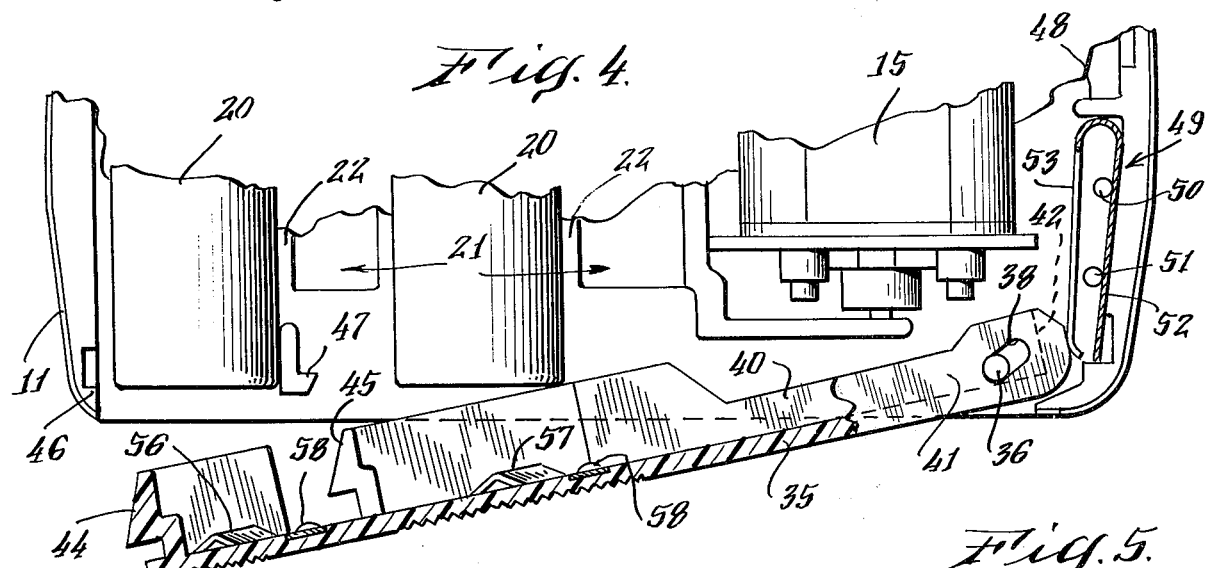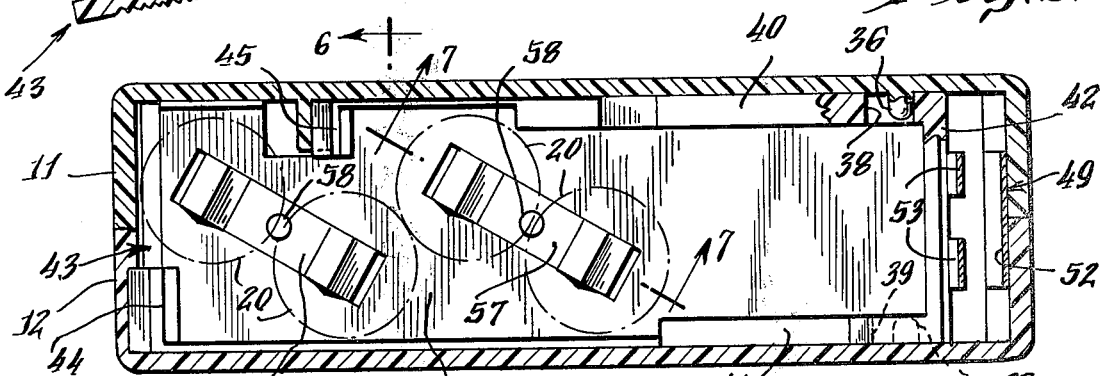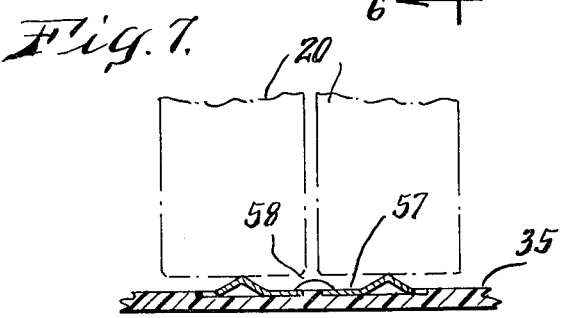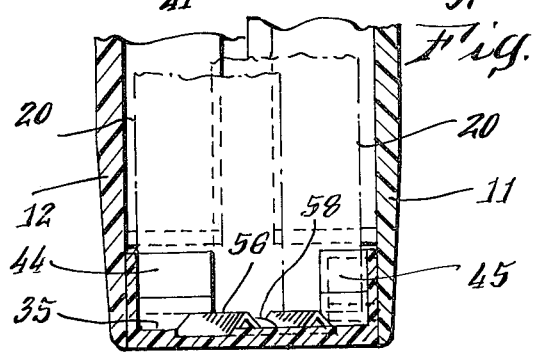

BATTERY OPERATED APPLIANCE

BACKGROUND OF THE INVENTION

This invention relates to new and useful improvements in battery operated appliances and in particular to means for housing and retaining batteries in operative position within the appliance casing.

In battery operated appliances such as flashlights, electric dry shavers and the like it is well-known to employ disposable batteries as a source of energy for operating the appliance output means. It is desirable in the latter devices to provide means for permitting ready access to the batteries for removal and replacement. In addition it is necessary to ensure that the batteries are located and maintained in operative position in the casing during use of the appliance. It is also well-known to provide battery operated appliances with removable and/or hinged covers to allow access to a battery compartment. In these devices the cover is provided with spring contacts for maintaining the battery in electrical contact with other metallic contacts which form in part the electrical circuit for the appliance when the cover is in a closed position.

Typical of the many devices of this type are those shown in U.S. Pat. Nos. 2,439,408, 3,252,733; and 3,629,793. In certain of these latter known devices the casings are formed with hinged covers having portions detented to the appliance casing to close the battery compartment. In other devices access to the batteries in the battery compartment is gained only after output means such as the flashlight bulb housing is removed. It is usually necessary in these devices that the means mounting the battery be provided with spring means to assure that electrical contact is achieved between the output contact of the battery and associated circuit contacts within the device.

In a device such as an electric dry shaver which may use disposable batteries it is desirable that the access means to the battery compartment for replacement of batteries utilize a minimum area of operation within the casing. The latter is required due to the compact nature of the device wherein additional mechanisms such as the cutter drive means, cutter head and motor must also be housed. In addition to ease of operation and ready availability means the access therefor must be provided which permit ready access to the battery compartment when desired in a relatively small compact casing wherein the space alloted for operable parts is critical.

It is an object of the present invention to provide novel means for mounting and retaining batteries within an appliance housing.

Another object is to provide novel access means for a battery compartment including closure means requiring a minimum area of operation within the appliance casing.

Still another object is to provide spring loaded means in association with the closure means to securely detent the closure means to the appliance casing and in detented position providing a positive means for positioning the batteries assuring electrical contact between the batteries and appliance input contacts.

SUMMARY OF THE INVENTION

The present invention comprehends a battery operated appliance having novel means for locating and maintaning the appliance batteries in operative position and providing ready access thereto for replacement when needed. In one embodiment the invention is utilized within an electrical dry shaver casing housing a motor and shaver cutter means operable thereby. A compartment is provided in the casing adjacent the motor compartment in which are housed disposable batteries. Novel closure means are provided for maintaining the batteries in the compartment and are located at the opening of the compartment accessible from without the casing. The closure means include a slidable cover having spaced cam detents on sidewalls thereof adapted for latching engagement with projections on the appliance casing. Hinge means are located at one end of the cover which permit slidable and pivotable movement of the cover relative to a spring member which in latched position of the cover is loaded or biased to maintain the cover in detented position. Spring contact means are provided on the cover to provide electrical connection of the batteries to the appliance electrical circuit. Additional spring contacts are located in the compartment to engage the batteries and bias the latter outwardly of the compartment to assist in movement of the cover to an open position during slidable movement thereof from latched position.

The above and other objects and advantages of the present invention will appear more fully hereinafter from a consideration of the detailed description which follows taken together with the accompanying drawings wherein one preferred embodiment thereof is illustrated.

BRIEF DESCRIPTION OF THE DRAWINGS

In the drawings:

FIG. 3 is a fragmentary view of the lower portion of the shaver of FIG. 1 showing closure means for the battery compartment in an unlatched position;

FIG. 4 is a view similar to FIG. 3 showing the closure means in a position moved from that illustrated in FIG. 3;

FIG. 5 is a sectional view taken on the line 5—5 of FIG. 2;

FIG. 6 is a sectional view taken on the line 6—6 of FIG. 5; and

FIG. 7 is a sectional view taken on the line 7—7 of FIG. 5.

DESCRIPTION OF THE PREFERRED EMBODIMENT

Figure 1:
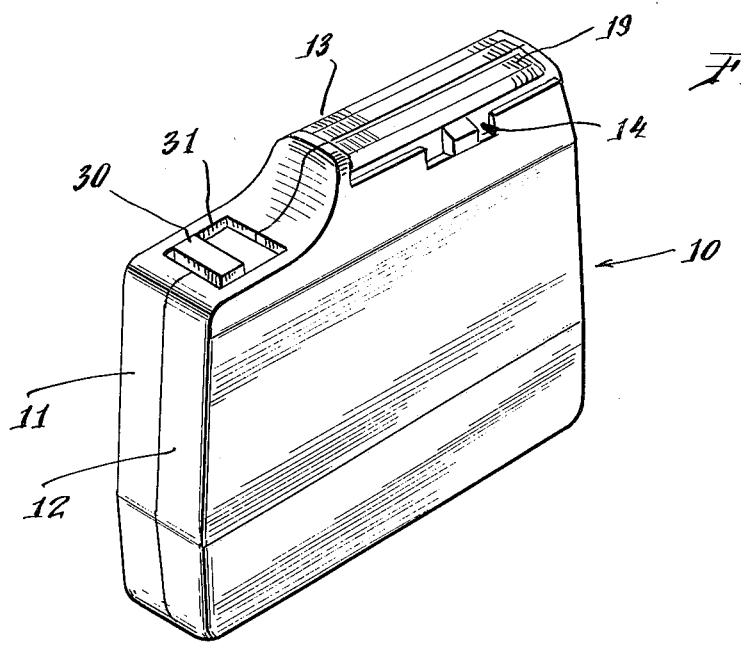
FIG. 1 is a perspective view of a battery operated electric dry shaver in which is incorporated one embodiment of the present invention.

Referring now to the drawings for a more detailed description of the present invention an embodiment of the present invention is disclosed as incorporated in an electric dry shaver casing which is generally indicated by the reference numeral 10 in FIG. 1. Shaver 10 comprises a premolded plastic casing having two complementary mated sections 11 and 12 maintained together by suitable fastener members such as clamp members (not shown). Shaver casing 10 also includes a cutter head 13 mounted in an upper recessed portion 14 formed by sections 11 and 12. Cutter head 13 is operable in a well-known manner through operation of a small low voltage DC motor 15 (FIG. 2) which drives a plastic oscillator member 16. Oscillator 16 has flexible leg portions 17 and a cutter engaging arm 18 which upon reciprocation of drive member 16 on legs 17 drives an inner cutter (not shown) within cutter head 13 in a well-known manner in a reciprocating path for shaving facial hair entering hair reception slots 19 in cutter head 13.

Shaver 10 as disclosed in the drawings (but not limited thereto) is a device wherein the motor 15 is powered by four disposable 1.5 volt batteries 20. A battery compartment 21 is formed by casing sections 11 and 12 in which the batteries 20 are housed. Molded ribs 22 are formed on the walls of compartment 21 to position batteries 20 and generally conform to the outer circular configuration of the batteries. Spaced spring-like metallic electrical contacts 26-27 are provided on the upper wall portion 28 of compartment 21 having portions 29 engaging the adjacent input or output contact of a battery 20 positioned in compartment 21 casing. Contact portions 29 are biased toward the batteries and create a downward force thereon tending to eject the battery 20 in a direction outwardly of compartment 21. A slidable switch member 30 is mounted in a recessed portion 31 of casing 10 for providing an on/off switching means for the appliance through position of contact 32 carried thereby into selective engagement and disengagement with contact portions 33 of contacts 26-27.

As mentioned it is a feature of the present invention to provide novel closure means for maintaining batteries 20 in compartment 21 and yet provide ready access thereto when desired. To this end a slide cover or closure means 35 is provided at the bottom (FIGS. 2 to 5) of casing 10 over the opening of compartment 21. Hinge means are provided for securing cover 35 to casing 10 and comprise pintle members 36 and 37 formed on opposite casing sections 11-12 (FIG. 5). Pintles 36-37 are mounted in elongated inclined slots 38 and 39 provided at one end of opposite sidewalls 40-41 of cover 35 at each side of an end wall 42 of cover 35.

Detent means including a cam hook-shaped latch detent 44 is provided at the leading edge 43 of cover 35 (FIG. 3). A second cam latch detent 45 hook is formed in sidewall adjacent to but spaced rearwardly from the leading edge 43 of cover 35. In latched position of cover 35 detent hooks 44-45 engage projections 46-47 formed on the walls of casing 10.

Means are provided for maintaining hooks 44-45 in latched position against inadvertent release from projections 46-47 by a U-shaped spring member 49. Spring 49 is positioned in casing 10 about bosses 50-51. The bight portion of spring 49 engages a projection 48 formed on the inner walls of casing 10. One arm 52 of spring 49 is biased against the sidewall of casing 10. The opposite arm 53 is bifurcated and biased against end wall 42 of cover 35. Cover 35 is maintained in latched position to casing 10 by spring 49 which urges hooks 44-45 in the direction of arrow A (FIG. 2) so that pintles 36-37 are maintained in the upper portions of slots 38-39. Detent hooks 44-45 are thereby locked securely against projections 46 and 47.

Diagonally disposed spring contacts 56 and 57 are provided on cover 35 and have biased portions for engaging with the bottom surface of a battery providing bridging contact between the batteries in closed position of cover 35. The central portion of contact 56-57 are fitted over bosses 58 on cover 35 and which bosses 58 are peened over to maintain the contacts in position.

Figure 2:
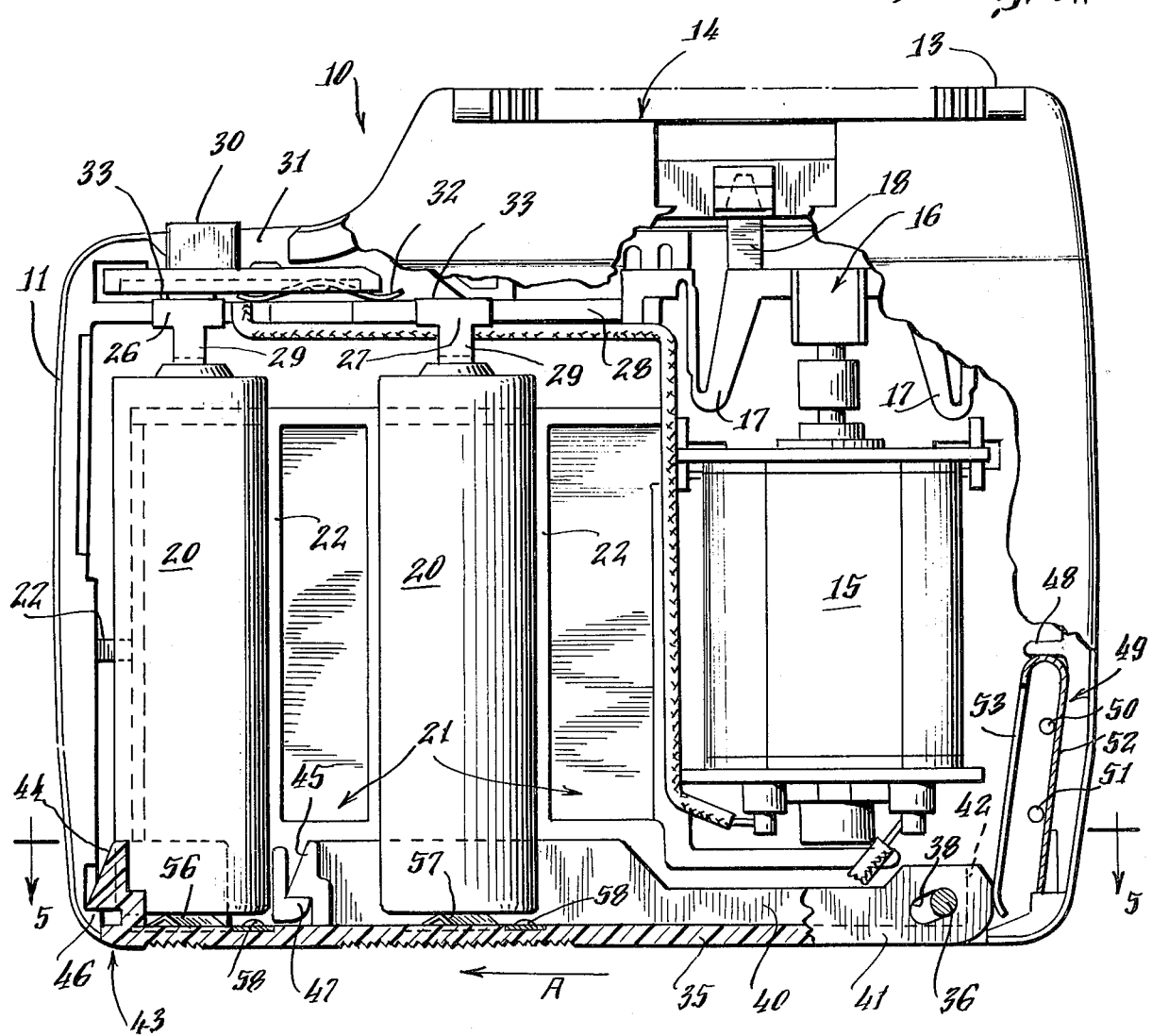
FIG. 2 is a fragmentary partly cross-sectional elevational view of the electric dry shaver of FIG. 1.

If it is desired to release cover 35 from the closed position of FIG. 2 the latter is manually slid in the direction designated by arrow B in FIG. 3 to move hooks 44-45 clear of projections 46-47 and allowing the cover to slide downwardly in slots 38-39 about pintles 36-37 from the position shown in FIG. 2 to the position shown in FIG. 3 whereat cover 35 is in an open position. In open position batteries 20 may be easily released from compartment 21 for replacement.

It will be understood that as hooks 44-45 are moved clear of projections 46-47 the mentioned spring force of portions 29 of upper spring contacts 26-27 bearing against batteries 20 will cause the latter to move against cover 35 and assist in the pivotal movement of cover 35 on the described hinge means.

As will be apparent cover 35 may be readily restored to closed position by manually rotating cover 35 in an opposite direction causing hooks 44-45 to reengage projections 46-47 (FIG. 2) whereat spring detent 49 maintains the latched engagement by exerting a force in the direction of arrow A against cover 35.

It will also be apparent from the foregoing that the described means for retaining batteries 20 in casing 10 has many advantages in use. Among other advantages the novel closure means require a minimum number of parts which are uncomplicated in configuration and require a minimum area of operation within casing 10 which is critical due to the relatively small size of the casing.

It is to be expressly understood that the present invention is now limited to the embodiment illustrated and described. Various changes can be made in the design and arrangement of parts without departing from the spirit and scope of the invention as the same will now be understood by those skilled in the art.

What is claimed is:
1. In a battery operated appliance,
   a. a casing,
   b. a compartment within said casing,
   c. an opening at one end of said compartment for receiving a plurality of batteries therein,
   d. closure means for said compartment opening including,
   e. a slide member having elongated slots and being operable to cover the compartment opening,
   f. hinge means interconnecting the closure means and the casing and including,
   g. pintles on opposite sidewalls of the casing in operative engagement with said slots, and
   h. detent means on the closure means and the casing to maintain the slide member in a detented position wherein the slide member covers the compartment opening,
   i. said detent means including means permitting slidable movement of the slide member on said pintles along the slots to release the slide member from said detented position prior to pivotal movement of the slide member about the pintles.

2. The appliance of claim 1 wherein said detent means include projections formed on the casing sidewalls and spaced hook members on the slide member engaging said projections in the detented position of the slide member.

3. The appliance of claim 2 wherein the slide member is provided with opposite sidewalls in which are formed said elongated slots and wherein one of said hook members is formed on the leading edge of the slide member and a second of said hook members is formed on one of said slide member sidewalls rearwardly of said leading edge.

4. The appliance of claim 1 wherein said detent means include a U-shaped spring member having one arm biased against said slide member and the other arm biased against a wall of the casing to maintain the slide member in said detented position.

5. The appliance of claim 1 wherein said compartment includes rib means for positioning batteries received therein, spring contacts on a wall opposite the opening for engaging said batteries, said spring contacts urging the batteries outwardly of the compartment against said slide member in said detented position and assisting said pivotal movement of the slide member.

\* \* \* \* \*